United States Patent Office 3,690,832
Patented Sept. 12, 1972

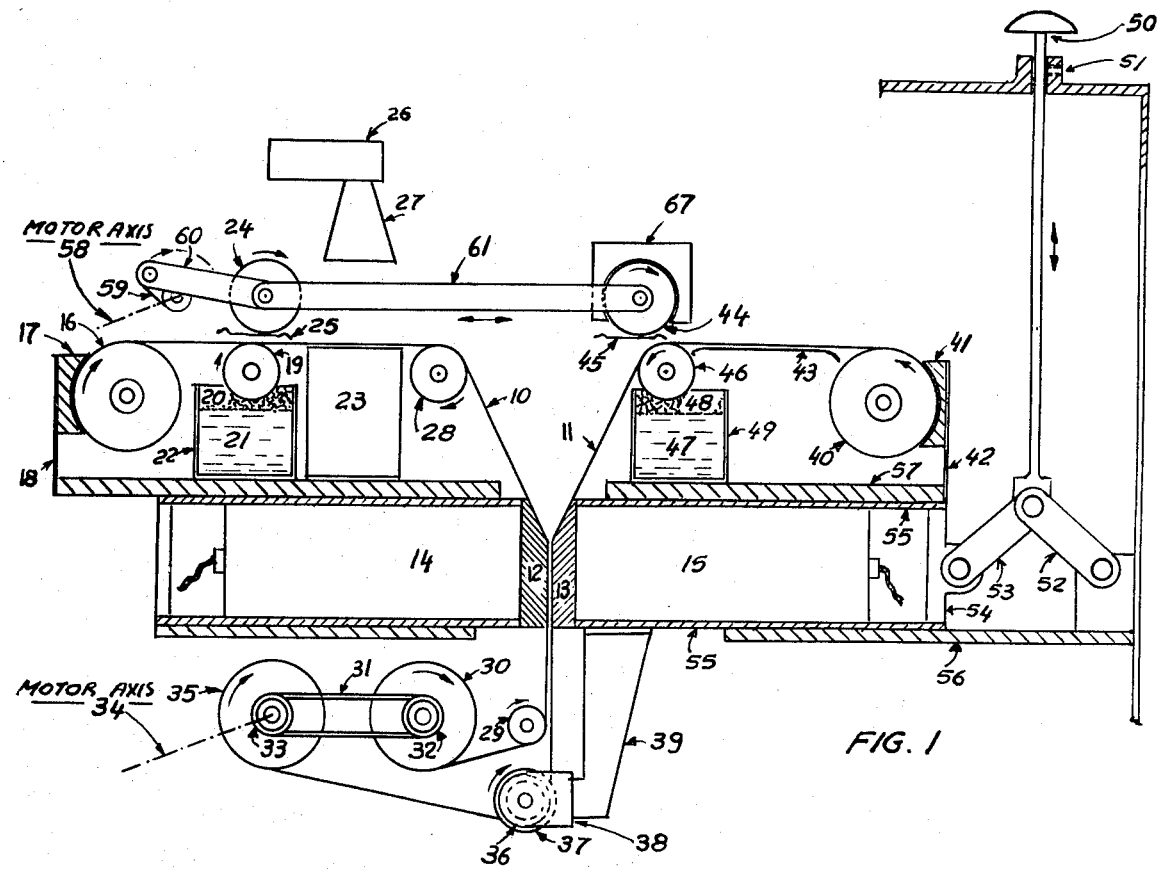
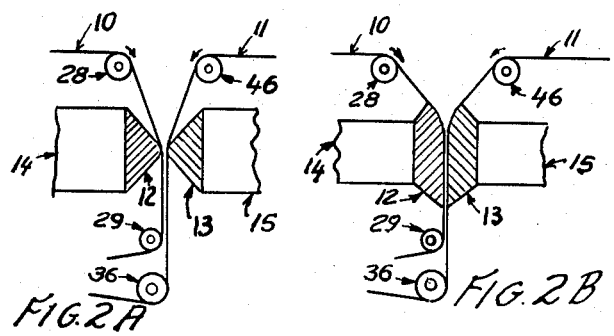
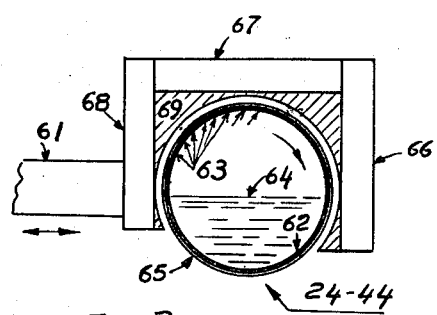
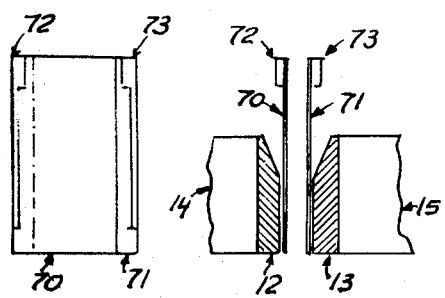
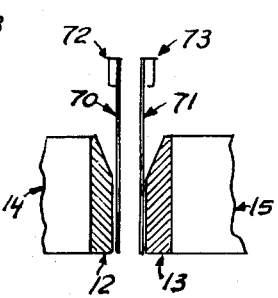
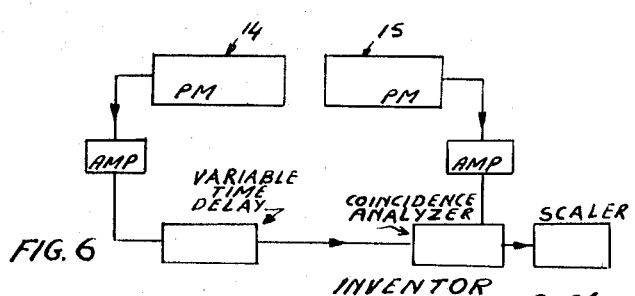

3,690,832
LUMINESCENCE DETECTION BY SURFACE
REACTION
Chris J. Plakas, Champaign, Ill., assignor to Vitalect
Corporation, Arlington, Va.
Filed Apr. 17, 1970, Ser. No. 29,475
Int. Cl. G01n 21/30, 33/16
U.S. Cl. 23—230 B
15 Claims

ABSTRACT OF THE DISCLOSURE

A system for testing a sample by means of bioluminescent or chemiluminescent reaction or scintillation fluorescence to detect living material or radioactive tracers therein. Bioluminescent and chemiluminescent reaction is achieved by bringing into contact between two photodetectors two light transparent surfaces, one of which carries the sample at spaced intervals and the other the reagent at similar intervals. Light emitted due to the reaction of the sample and reagent on the interface of the surfaces is transmitted through optical coupling liquid and light pipes to photocathodes of the photodetectors. Scintillation fluorescence is achieved in a similar manner but with one surface carrying sample containing a tracer and the other surface made of scintillation material. For special individual experiments involving extremely small quantities of sample the surfaces may be two microscope cover plates bearing the sample and reagent. The output signals of the photodetectors are transmitted through amplifiers and coincidence circuitry into a scaler or display unit, thus accurately recording the number of reactions of individual cells or their extract, the number of disintegrated particles, or the total energy of reaction. The entire system is ambient light tight for protection and greater efficiency in detecting low levels of luminescence.

FIELD OF THE INVENTION

The present invention relates to a system for detecting the existence of microorganisms or measuring microbial metabolism and, more specifically, to a system for detecting and measuring low levels of light emitted as a result of bioluminescent or chemiluminescent reaction or scintillation fluorescence.

DESCRIPTION OF THE PRIOR ART

The application of bioluminescent and chemiluminescent reactions to detect the presence of microorganisms has been well established. This technique has application in a variety of areas including water pollution research, quality control of drinking water, and clinical research of virus in tissues. A detailed description of the status of such detection methods may be found in studies by W. D. McElroy, Proceedings, National Academy of Science, 33, 1947, p. 343; application Ser. No. 433,388 of J. R. Clendenning; Pat. No. 3,359,973 of D. G. Hoffman; NASA case No. 10,218–1 of Chris J. Plakas; Edward Rich and Chris Plakas, Aerospace Medicine, August 1968, p. 879; and "Chemiluminescent Methods" by W. S. Oleniacz, Environmental Science and Technology, 2, #11, November 1968, p. 1030.

All current methods for detecting biochemiluminescent reaction are based on the use of a reaction chamber and one photodetector, which limits the resolution, sensitivity, and versatility to detect individual microorganisms. The best of these methods claims capability of detecting reaction of several hundred large size microorganisms such as *Aspergillus niger, Saccharonyces cerevisiae*, etc. The use of the reaction chamber, with the reagent medium injected into the sample medium or vice versa, reduces the probability of detecting reaction of single microorganisms and limits the efficiency of the reaction due to reflection and absorption of luminescence from the reaction chamber to the photodetector. The object of the present invention is to present a new way of mixing and detecting the reaction of very small volumes of sample and reagent. By applying the sample and reagent to plane surfaces rather than in volume and by transmitting the luminescence directly from the point of the reaction to the photocathodes of two photodetectors through light pipe coupling and coincidence circuitry the accuracy and efficiency of detection is greatly improved.

Studies concerning radiotracers are numerous as well as instrumentation in this field. Radiotracer techniques and scintillation luminescence have many successful applications in the fields of chemistry, biochemistry, and microbiology and more specifically in monitoring metabolism of microorganisms and water pollution control. A detailed description of the status of such methods may be found in "Nuclear Methods in Air and Water Pollution Analysis" by F. A. Iddings, Environmental Science and Technology, 3, #2, February 1969, p. 132 and Basic Principles of the Tracer Method by C. W. Sheppard, 1962.

In order to protect scintillators from contamination it is common practice to keep a radioactive sample at a safe distance from the scintillator, but consequently the efficiency of detection is reduced due to the range of the particles. The present invention allows for direct contact between the sample and the scintillation surface because the scintillation surface is not a permanent part of the photodetector assembly and is disposable or easily cleaned. This results in greater efficiency of detection and facilitates continuous monitoring. The main advantage of the present system with respect to scintillation fluorescence is that it permits detection of isotopic tracers with no modification except the change of surface.

SUMMARY OF THE INVENTION

It is therefore an object of the present invention to provide a system for detecting the light output of a bioluminescent or chemiluminescent reaction with three decimal figures more sensitivity than prior detection systems.

Another object of the invention is to provide a system that will also detect the light output of scintillation fluorescence with greater efficiency due to direct contact of sample and scintillator.

Another object of the invention is to provide accurate integration of the area under the bio-reaction curve by using a thin uniform layer of sample. The integrated area under the reaction curve represents the energy and is proportional to the number of microorganisms present.

Another object of the invention is to provide a means for accurate counting of microorganisms by recording the individual reaction of each cell as two moving tapes meet, thus forming a continuous series of reaction lines across the interface of the tapes.

An additional object of the invention is to provide versatility in extraction of microorganisms by using ultrasonic energy or extractant liquid depending on the species and size of cells being tested.

An additional object of the invention is to provide a means for guiding light through light pipes of a low refractive index directly to the photocathodes of the photodetectors with no air interfaces and consequently no light losses.

An additional object of the invention is to permit application of various shapes of light pipe lenses to collect the light and focus it to the desired area size on the photocathodes.

An additional object of the invention is to provide means for continuous automated monitoring of microorganisms.

An additinal object of the invention is to provide a means for modification utilizing plates for individual experiments with manual operation.

BRIEF DESCRIPTION OF THE DRAWING

These and other objects and aspects of the invention will be further clarified by the following detailed description and accompanying drawings, wherein:

FIG. 1 is a side view of the surface reaction system, showing the principles of operation according to the invention;

FIG. 2A and FIG. 2B are side views of the light pipe portion of the system of FIG. 1, showing possible shapes of light pipe lenses;

FIG. 3 is a side view of the feeder portion of the system of FIG. 1;

FIG. 4 is a front view of the plates, showing overlapping as in reaction position;

FIG. 5 is a side view of the modification utilizing plates, showing thir position in relation to the light pipe-photodetector assemblies; and FIG. 6 is an electronic bloc diagram of the coincidence circuitry of the photodetectors.

DESCRIPTION OF THE PREFERRED EMBODIMENTS

Referring now to FIG. 1 of the drawings, for detection of biochemiluminescent reaction in accordance with the preferred embodiments of the invention, the light transparent tape 10 begins its linear motion from reel 16, passes under the sample feeder 24 and between the extractors 23 and 26, and carries the extracted sample in the form of an aquatic layer between the light pipes 12 and 13 which are mounted in front of the photodetectors 14 and 15. Light transparent tape 11 begins its linear motion from the reel 40, passes under the reagent feeder 44 and carries the reagent in the form of an aquatic layer between the light pipes 12 and 13. Because the space between the light pipe-photodetector assemblies 12/14–13/15 is narrow, the reaction surfaces of the tapes 10 and 11 contact each other and the reaction takes place. The coupling surfaces of the tapes 10 and 11 which face the light pipes are coupled by oil or other optical coupling liquid to the respective light pipe-photodetector assemblies 12/14–13/15 for efficient light transmission.

Now with more specific reference to the operation of the system, reel 16 carrying a light transparent plastic tape 10 of 0.05 to 0.2 mm. thickness turns free on its shaft. A pressure block of Teflon 17 is mounted on a leaf spring 18 which exercises a light pressure on the reel 16 through the Teflon 17 to restrict any free motion of the reel due to inertia. Tape 10 moves over the roller 19 which turns free on its shaft due to the friction of the moving tape. The sponge 20 transfers the coupling oil 21 from the container 22 to the roller 19, which is made of white rubber material. Roller 19 deposits a film of coupling oil on the coupling surface of tape 10 for light coupling on the light pipe 12. Tape 10 then passes between an ultrasonic transducer 23 and the sample feeder 24 which wil be further explained below. Sample feeder 24 rolls to the right over the tape 10 depositing a thin layer of aquatic sample of approximately 0.1 mm. thickness on the reaction surface of the tape 10 and resets on its holder 25. For maximal bioluminescent reaction where firefly enzyme is used as reagent, disruption of microbial cells in the sample is necessary. This may be achieved by ultrasonic or chemical extraction. the sample may be extracted with ultrasonic waves radiated by the transducer 23 without disturbing the physical position of the sample on the reaction surface. The system also includes as an alternate method of extraction an aerosol spray mechanism 26 comprised of a piston pump operated by solenoid and an aerosol valve to spray extractant (butanol or dimethyl sulfoxide) over the deposited sample through the guide 27. The choice of method depends on the kind of microorganisms in the sample. Tape 10 guided by free roller 28 continues now in a downward path, passes the narrow space between the light pipe-photodetector assemblies 12/14–13/15 and the sample on its reaction surface contacts the reagent on the reaction surface of tape 11 resulting in a luminescent reaction. The light pipes 12 and 13, made of quartz and polymethyl methacrylate, guide the light output from the interface of tapes 10 and 11 to the photocathodes of the photodetectors 14 and 15 through coupling oil deposited on the coupling surfaces of tapes 10 and 11. Tape 10 continues its path around the free roller 29 and is colected on the reel 30 which is turned on its shaft by the chain 31 with attached sprockets 32 and 33 and the motor 34.

The description above concerns the path of tape 10 carrying aquatic sample containing microorganisms or their extract. The description following will concern the path of tape 11 carrying reagent (enzymes or luminol solution). The reel 40 carries the tape 11 of the same specifications as tape 10. There is also a pressure block of Teflon 41 and a leaf spring 42 to prevent free motion of the reel 40. Tape 11 moves over the support plate 43 and under the reagent feeder 44 which will be further explained below. The reagent feeder 44 distributes reagent over the reaction surface of the tape 11 and resets on its holder 45. The free roller 46, similar to that of roller 19, guides the tape 11 and deposits a film of coupling oil on the coupling surface of tape 11 for light coupling on the light pipe 13. The sponge 48 transfers the coupling oil 47 from the container 49 to the roller 46. Tape 11 continues now in a downward path and when it passes the narrow space between the light pipe-photodetector assemblies 12/14–13/15 the reagent on its reaction surface contacts the sample carried on the reaction surface of tape 10 and reaction occurs. The luminescent output is detected by the photodetectors 14 and 15. Tape 11 continues its path around the free roller 36 and is collected on the reel 35 which is turned by the motor 34.

The narrow space between the light pipe-photodetector assemblies 12/14–13/15 may be adjusted through the control 50 and secured in position by the screw 51. The roller 36, encoder disc 37, and encoder 38, all mounted on the arm 39 which is attached to the light pipe-photodetector housing 55, are also adjusted to accommodate the uniform spacing between the tapes 10 and 11.

The intervals between individual experiments on the tapes 10 and 11 are controlled by the motor 34 which operates under the programmed logic circuitry of a Rotaswitch photoelectric encoder 38. The encoder 38 interrupts the motor 34 when the disc 37 attached to the roller 36 rotates a preadjusted angle. For integration of total energy reaction the tapes 10 and 11, carrying respectively deposits of sample and reagent, move rapidly (about 2 cm./sec.) to the reaction position between the light pipe-photodetector assemblies 12/14–13/15 and stop. As shown in FIG. 2B, the coupling surfaces of the light pipes are planes, the area of each at least twice the area of a photocathode, with corners shaped to permit smooth passage of the tapes. While the output of this experiment is being detected and recorded by the photodetectors 14 and 15, the feeders 24 and 44 are simultaneously depositing sample and reagent on another segment of tapes 10 and 11 respectively for the next experiment. For counting individual microorganisms the tapes 10 and 11, carrying respectively deposits of sample and reagent, move rapidly (about 2 cm./sec.) to a point immediately adjacent to the reaction position, stop momentarily, and then continue slowly between the light pipe-photodetector assemblies 12/14–13/15 at a decreased rate of motion (about 2 cm./min.) for the detecting and recording phase. As shown in FIG. 2A, the coupling surfaces of wedge-shaped light pipes are narrow edges of sub-millimeter width that define a series of reaction lines across the width of the moving tapes. Simultaneously the feeding phase is preparing another segment of tapes 10 and 11 for the next experiment. Experiments may be continuous by automatic monitoring or an individual experiment may be operated manually.

Referring now to FIG. 3 of the drawings, the sample feeder 24 and reagent feeder 44 are identical in construction and operation with the exception that a thermoelectric cooling housing is attached to the feeder frame 61 for use with enzyme reagents. Each feeder is comprised of a metallic cylinder 62, the length of which is equal to the width of the transparent tape. The upper half of each cylinder is perforated with holes 63 in tenths of a mm. diameter and the lower half is filled with liquid 64 (sample or reagent) supplied through an opening in one end. Each cylinder 62 is covered by a felt material 65 which absorbs the liquid which passes through the holes and transfers it to the tapes when the carriage mechanism 61 moves the cylinders to the right onto the tape surfaces. The thermoelectric cooling elements 66, 67, and 68 and the heat conductive material 69 attached to the feeder frame 61 may be engaged to control the temperature of enzymes when such reagents are being used. Returning now to FIG. 1, feeders 24 and 44 are operated simultaneously by the carriage mechanism which is comprised of a motor 58 operating an ordinary type slotted crank 59 and rod 60 to translate rotary into linear motion and the attached feeder frame 61 consisting of two side brackets attached to the respective feeder shafts. The carriage mechanism moves the feeders 24 and 44 onto the respective tape surfaces 10 and 11 and controls the area of liquid application.

For detection of scintillation fluorescence the system operates as described for bio-chemi-luminescence with the exception that the sample contains an isotopic tracer the energy of which is to be counted and the extraction step for tape 10 is not necessary. Also, in this experiment tape 11 is made of special scintillation plastic (ZnS) of 0.3 to 0.5 mm. thickness and carries no reagent. When the radioactive sample and the scintillation tape make contact between the light pipe-photodetector assemblies 12/14–13/15 the particles of the tracer absorbed in the plastic scintillator produce fluorescence which is transmitted to the photodetectors in the same manner as in bio-chemi-luminescence. The scintillation tape 11 may be rinsed and reused if the half life of the isotope is short and safety regulations permit.

For special individual experiments involving extremely small quantities of sample (about 0.01 ml.) the system allows for modification of operation utilizing two glass microscope cover plates instead of tapes. Referring to FIG. 1, the control 50 and arms 52 and 53 slide the housing 54 and 55 of the light pipe-photodetector assembly 13/15 between the guides 56 and 57 to the right to facilitate removal of the tapes and insertion of the plates. Referring now to FIG. 5 of the drawings, small portions of sample and reagent are manually applied respectively to the reaction surfaces of microscope cover plates 70 and 71, of any convenient size but usually 50 x 24 x 0.19 mm., and coupling oil is manually applied to the coupling surfaces of both plates 70 and 71. The plates are held in plastic support frames 72 and 73 and manually positioned between the light pipe-photodetector assemblies 12/14–13/15. Small magnets inserted into the top of the support frames 72 and 73 hold the plates 70 and 71 against the respective light pipe-photodetector assemblies 12/14 and 13/15. The control 50 and arms 52 and 53 of FIG. 1 move the light pipe-photodetector assembly 13/15 with reagent plate 71 attached by support frame 73 to the left until contact is made with sample plate 70. The reaction takes place and the output is detected and recorded in the same manner as described for the tape operation. When the plate modification is used to detect scintillation fluorescence plate 71 is made of scintillation material, such as Pilot B (a trademark of Pilot Chemicals, Inc. made from organic fluors in a matrix of polyvinyltoluene), calcium fluoride, or other plastic scintillators.

The detector circuitry for the system, as indicated in FIG. 6 of the drawings, may be comprised of two bi-alkali photomultipliers of 13 dynode type, two high voltage power supplies for their dividers, two amplifiers, two low voltage power supplies for the amplifiers, a variable time delay unit, a coincidence analyzer, and a scaler for the output data. The scaler may be a commercially available digital counter, chart recorder, or oscilloscope. Application of this coincidence circuitry to surface reaction serves to produce an output signal from the analyzer only if a luminescent event is simultaneously detected by both photomultipliers. Consequently, any dark current noise or other internal or external interference in the circuitry can not affect the accuracy of measurement.

The main housing of the surface reaction system is an ambient light tight enclosure with a service door to permit supply preparation for the experiments.

Thus there has been provided a new, efficient and adaptable surface reaction system which permits accurate testing of a variety of samples. By allowing a reaction area one hundred times greater than that of the older volume reaction systems for the same quantity of sample, this surface reaction system significantly increases the ability to differentiate reaction of individual cells. The new system has a high light transmission efficiency due to the light pipe coupling and high signal to noise ratio due to coincidence circuitry, thus resulting in total resolving power of three decimal figures more sensitive than the older systems. However, the scope of the invention is not limited to the specific embodiment described herein but includes the various alternatives and modifications that fall within the true spirit and scope of the invention as defined by he following claims.

What is claimed is:

1. A method of optically detecting the presence of microorganisms and radioactive tracers in a sample comprising depositing said sample on a first light transparent surface, depositing a reagent on a second light transparent surface, bringing said surfaces into contact for luminescent reaction, and detecting said luminescence as an indication of said microorganisms and tracers present in said sample.

2. A surface reaction system for detecting the presence of microorganisms and radioactive tracers in a test sample by means of luminescent reaction, comprising means for depositing sample and reagent materials respectively on two light transparent surfaces, means of bringing said sample and reagent surfaces into contact for reaction and consequent luminescence, and detector means for recording the intensity of said luminescence, thus indicating the presence of said microorganisms and tracers.

3. The system of claim 2 wherein said means for depositing said sample and reagent materials on said two light transparent surfaces comprises a sample feeder and a reagent feeder and a mechanism for depositing said materials at spaced intervals on said surfaces in a uniform layer of adjustable area.

4. The system of claim 2 wherein said light transparent surfaces further comprise two light transparent plates and a mechanism for positioning said plates between detector means.

5. The system of claim 2 wherein said means of bringing sample and reagent surfaces into contact for reaction further comprises a mechanism for adjusting space between said detector means.

6. The system of claim 2 wherein one of said transparent surfaces is made of scintillator material.

7. The system of claim 2 wherein said light transparent surfaces comprise light transparent tapes for carrying sample and reagent materials and bringing said materials into contact for luminescent reaction.

8. The system of claim 7 wherein means of bringing sample and reagent surfaces into contact for reaction and consequent luminescence comprises means for guiding said tapes between detector means and means of controlling said tapes' motion.

9. The system of claim 2 including means for extraction of said sample before bringing it into contact with reagent.

10. The system of claim 9 wherein said means for extraction of said sample comprises an ultrasonic transducer for radiating ultrasonic waves into said sample.

11. The system of claim 9 wherein said means for extraction of said sample comprises means for spraying extracting liquid on said sample.

12. The system of claim 2 wherein said detector means includes optical coupling means, light pipes, and photodetectors with coincidence circuitry.

13. The system of claim 12 wherein said detector means includes means of applying optical coupling liquid to surfaces facing said light pipes to facilitate good optical coupling.

14. The system of claim 12 wherein said detector means further includes pairs of interchangeable light pipes, the shape of a first pair being such that their coupling surfaces are narrow edges and the shape of a second pair being such that their coupling surfaces are planes of greater area than that of the photocathodes of the photodetectors, said light pipes thus determining the area of reaction and defining the luminescence recorded by said photodetectors.

15. The system of claim 12 wherein said detector means further includes two photomultiplier tubes with coincidence circuitry for simultaneous recording of said luminescence produced by said surface reaction and eliminating circuitry interference.

References Cited

UNITED STATES PATENTS

| | | | |
|---|---|---|---|
| 2,741,544 | 4/1956 | Chaikin et al. | 23—232 X |
| 3,155,451 | 11/1964 | Dunster et al. | 250—71.5 X |
| 3,288,995 | 11/1966 | Demorest | 250—71.5 |
| 3,575,691 | 4/1971 | Pollard et al. | 250—83.6 FT |

NORRIS O. WOLK, Primary Examiner

R. M. REESE, Assistant Examiner

U.S. Cl. X.R.

23—253; 250—71.5 R, 106 SC